US006892265B2

(12) United States Patent
Sagues et al.

(10) Patent No.: US 6,892,265 B2
(45) Date of Patent: May 10, 2005

(54) CONFIGURABLE CONNECTORIZED I/O SYSTEM (75) Inventors: Paul Sagues, Ross, CA (US); John T. Peuarch, San Francisco, CA (US); Leslie H. Woods, Oakland, CA (US)

(73) Assignee: Berkley Process Control, Inc., Richmond, CA (US)

( * ) Notice: Subject to any disclaimer, the term of this patent is extended or adjusted under 35 U.S.C. 154(b) by 424 days.

(21) Appl. No.: 10/071,870

(22) Filed: Feb. 8, 2002

(65) Prior Publication Data
US 2002/0119706 A1 Aug. 29, 2002

Related U.S. Application Data (60) Provisional application No. 60/269,129, filed on Feb. 14, 2001.

(51) Int. Cl.[7] .................. G06F 13/00; G06F 13/38; G06F 13/40; H01B 11/00; H01B 11/02
(52) U.S. Cl. .................. 710/301; 710/100; 710/316
(58) Field of Search .................. 710/3, 100, 300, 710/301, 316, 1, 313, 72, 63, 305; 439/189, 497, 502, 620, 505; 235/462.15; 361/683, 686, 752, 760; 714/25; 174/34; 340/825.52; 709/253; 713/300

(56) References Cited

U.S. PATENT DOCUMENTS

| 4,360,913 | A | * | 11/1982 | Struger et al. ............... 370/535 |
| 4,695,955 | A | | 9/1987 | Faisandier ................... 364/413 |
| 5,596,169 | A | | 1/1997 | Baker et al. ................... 174/33 |
| 5,630,170 | A | * | 5/1997 | Koizumi et al. ............... 710/12 |
| 5,696,988 | A | | 12/1997 | Dale et al. .................... 395/821 |
| 5,701,515 | A | * | 12/1997 | Gradeler ....................... 710/14 |
| 5,872,999 | A | * | 2/1999 | Koizumi et al. ............... 710/72 |
| 5,905,249 | A | | 5/1999 | Reddersen et al. ..... 235/462.15 |
| 5,938,754 | A | | 8/1999 | Edwards et al. ............. 710/129 |
| 6,301,633 | B1 | * | 10/2001 | Chapman ..................... 710/305 |
| 6,349,235 | B1 | * | 2/2002 | Gibart et al. .................. 700/11 |

FOREIGN PATENT DOCUMENTS

EP          0 436 458 A2     7/1991

OTHER PUBLICATIONS

"High–density and high–pin count flexible SMD connector for high–speed data bus" by Sasaki, S; Kishimoto, T. (abstract only).*

"High performance mainframe computer cables" by Beaman, B. (abstract only).*

* cited by examiner

Primary Examiner—Gopal C. Ray
(74) Attorney, Agent, or Firm—David Jaffer; Pillsbury Winthrop LLP (57) ABSTRACT

A system for making interconnections between an input/output module and a first device and a second device wherein the system uses standard cables and connectors. The input/output module includes a standard first connector for making connection with a standard first transmission line cable for conveying signals between the module and the first device, and at least one second connector, with such second connector connecting to a first end of a second standard cable. A second end of the second standard cable includes a standard cable connector for making connection to a corresponding connector of the second device. The input/output module is configured to contain programmable logic for making the required connections between the module and the first and second devices.

17 Claims, 9 Drawing Sheets

CONFIGURABLE CONNECTORIZED I/O SYSTEM

This application claims priority from U.S. Provisional Application Ser. No. 60/269,129 filed Feb. 14, 2001.

BACKGROUND OF THE INVENTION

1. Field of the Invention

The present invention relates generally to cabling and cabling systems, and more particularly to a universal cabling system wherein the requirement for specific wire interconnections between first and second devices is accomplished through use of a programmable I/O module for making connection to the first device, and directing connections from the first device to selected wires of a cable for connection to the second device.

2. Description of the Prior Art

Complex electrical/electronic systems often require custom cable configurations. Cables are usually special configurations for a particular application. Even in relatively simple systems such as home audio and small computer systems, a number of different cables are typically required. In larger applications, such as industrial control systems, the number of custom cable designs is extensive. In industrial control systems such as those that run automotive plants, etc., interaction is required between control apparatus and sensors and actuators. The apparatus providing the corresponding connections will be referred to as input and output systems. Through the output system, the control system can turn on lights, pumps, valves and other devices. Similarly, through the input system, the control system can sense the state of a pushbutton, whether a switch is on or off, or whether a tank is full or how fast a shaft is turning.

Figure 1:
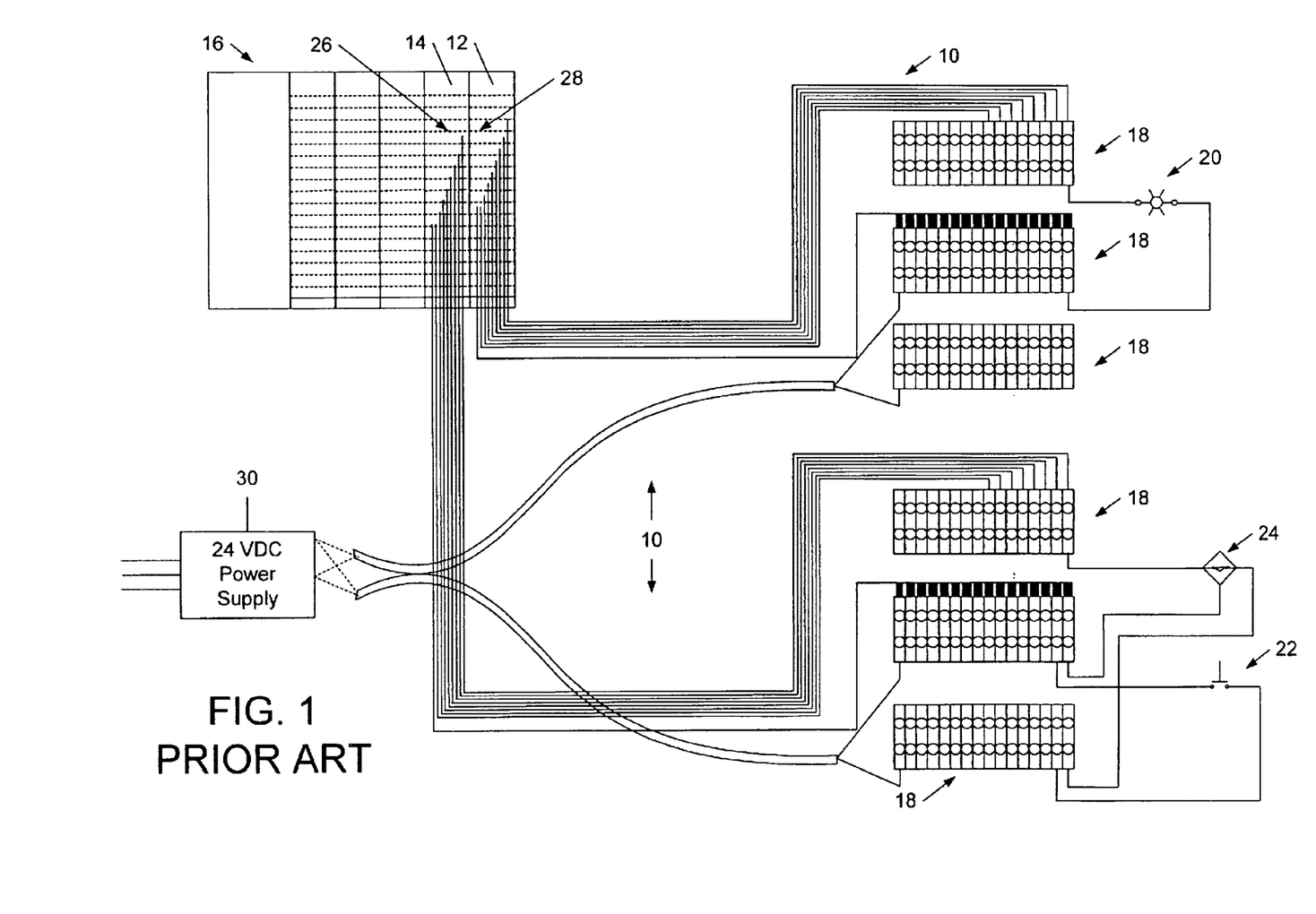
FIG. 1 illustrates a prior art interconnection system using individual wires.

In prior art control systems, such as a Programmable Logic Controller (PLC), the user of the control system electrically connects the sensors and actuators to the input/output systems using individual wire connections or via connectorized wire harnesses. A common method of connecting sensors and actuators to industrial control systems is through the use of individual wire connections via terminal blocks. Terminal blocks usually employ a screw-driven clamp. An electrical wire's insulation is removed from the end, and then the bare wire is slid under the screw-driven clamp. The screw is then tightened to secure the wire under the clamp and effect an electrical connection between the wire and the terminal block. Increasingly, various spring clamps are used to hold the wire, but these are essentially the same as screw-driven clamps. FIG. 1 shows how individual wires 10 are connected to the input and output Modules 12, 14 of a PLC 16 through terminal blocks 18 to three devices, a light bulb 20, a switch 22 and a proximity switch 24. A proximity switch is a common type of switch that can detect the presence (typically) of metal, and gives an indication by interrupting or passing electrical current.

A disadvantage of the method illustrated in FIG. 1 is that the terminals 26, 28 on the input or output modules of the PLC 16 are not necessarily conveniently arranged for facilitating easy connection of a load, such as a light bulb or switch. As a result, a great deal of custom, hand-wiring must be performed in order to effect the interconnections. In addition the electricity, from a supply 30 to power certain actuators and sensors such as the light bulb or proximity sensor, must be provided on the terminal blocks 18 in order to make connections to the light bulb or switch. In general, the prior art output Modules 12 and 14 do not supply power to the load, they only switch the power. The custom wiring design and implementation illustrated in FIG. 1 significantly adds to the cost and size of the system.

Figure 2:
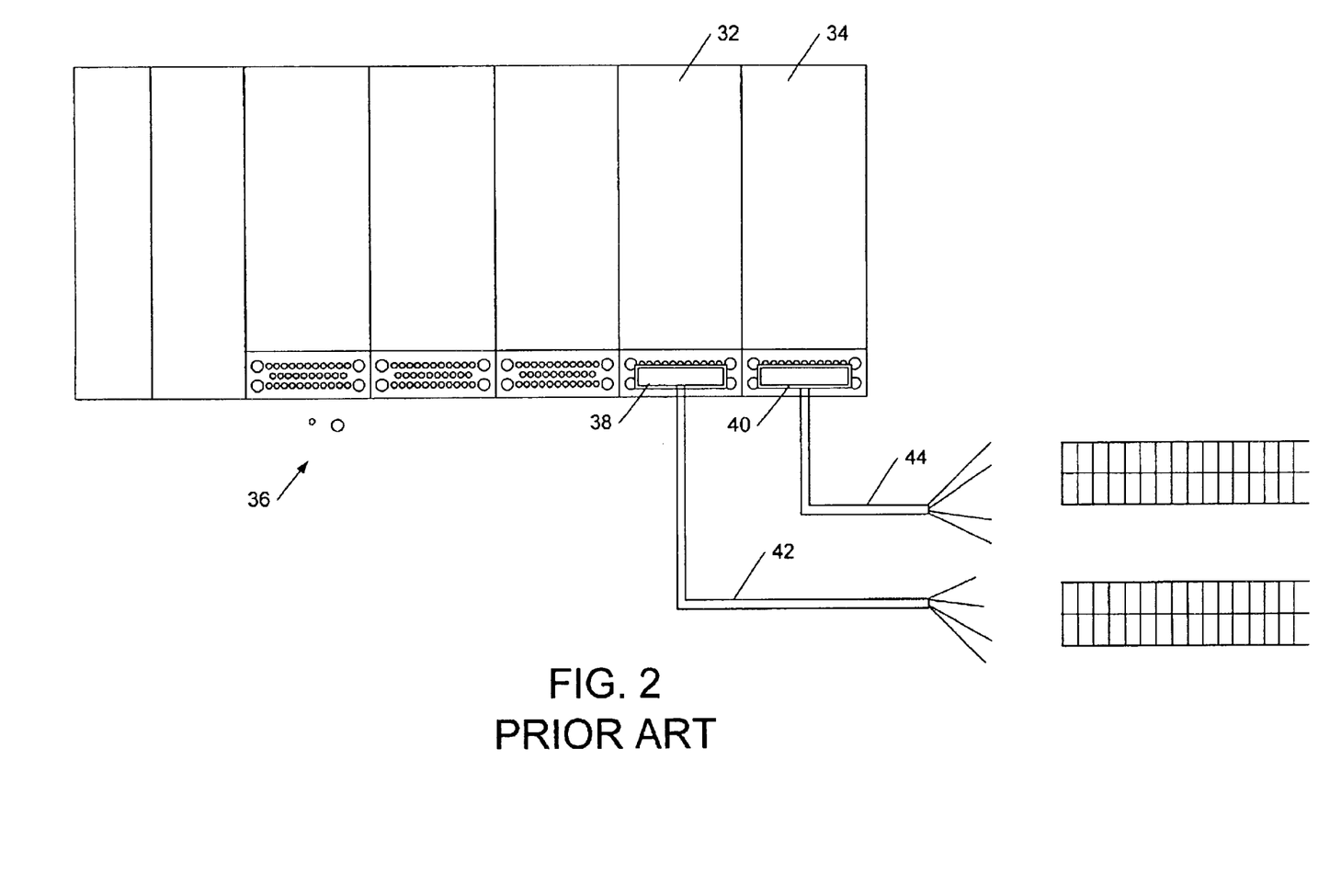
FIG. 2 illustrates a prior art interconnection system using cables.
Figure 3:
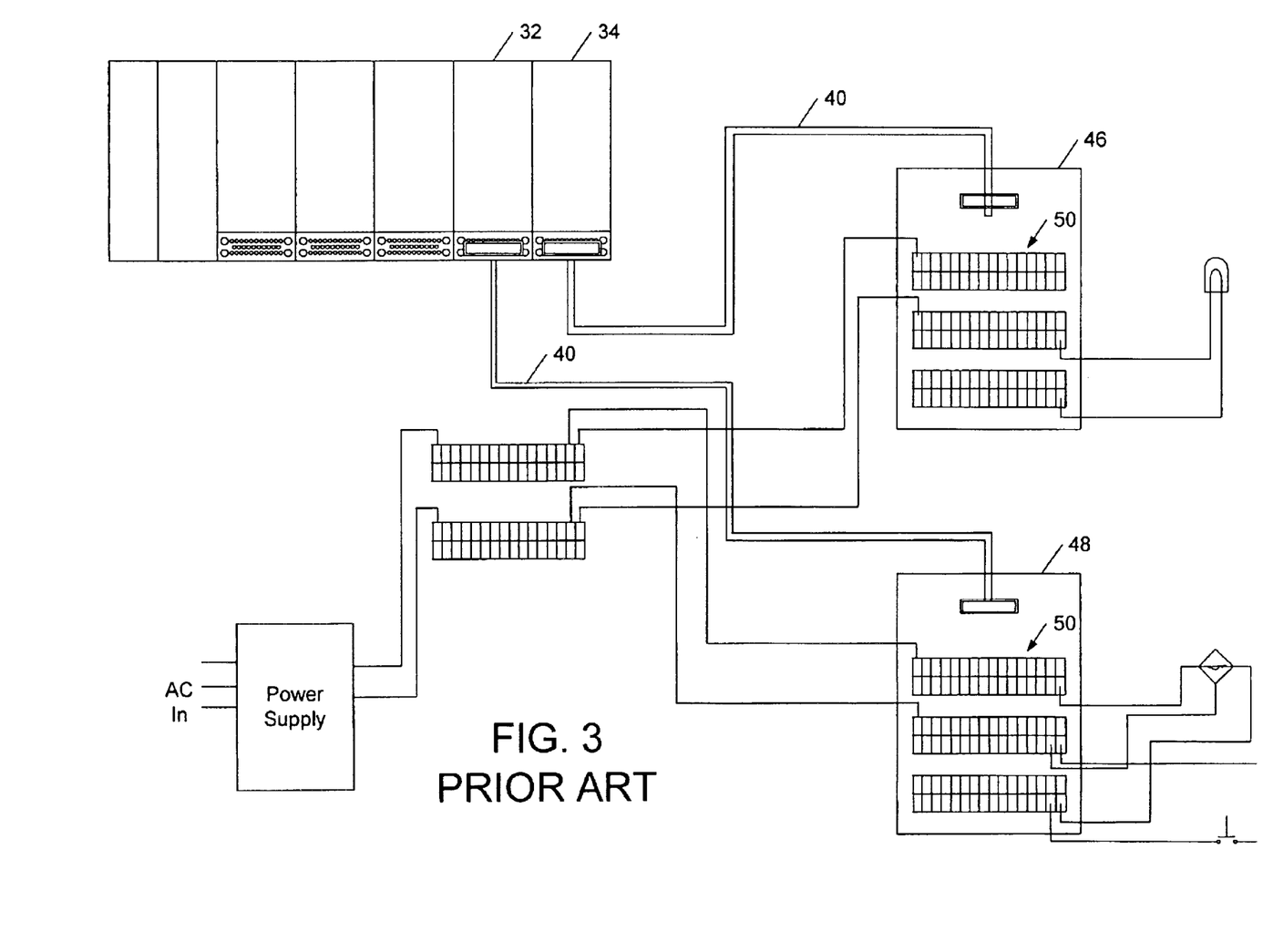
FIG. 3 illustrates the prior art use of circuit boards for interconnecting cable wiring to selected devices.

Another method of connecting an industrial control system such as a PLC to a load is via a connectorized wire harness or cable. FIG. 2 shows one input module 32 and one output module 34 from a PLC 36. The input/output modules 32 and 34 are equipped with connectors 38 and 40 respectively that allow cables 42 and 44 to be used to make connection with various sensors and actuators. Unfortunately, the cable from the input or output module cannot generally connect directly to the sensor or actuator because the connectors 38 and 40 on the PLC 36 are rarely configured to accept a sensor signal or provide the actuator power. For this reason, FIG. 3 represents the most common method of connecting a PLC to a sensor or actuator when employing connectors on the PLC. In FIG. 3, cables 40 from the PLC input 32 and output 34 modules connect to circuit boards 46 and 48 which contain terminal blocks 50 for making connections to the control system. Therefore, even when connectorized cables are employed, the prior art still requires making connections through use of individual wire connections such as terminal blocks.

Making a direct connection between a PLC and a sensor or actuator without individual wire connections is problematical. An example situation is when a PLC must be connected to a device that already is equipped with a connector. The need to connect a PLC to such a device is very common. A typical device is a mass flow controller equipped with a connector for connecting signals that must be connected to the PLC. In this case, the connections are complicated by the fact that the PLC output module contains only outputs and the PLC input module contains only inputs, whereas the mass flow controller connector contains signals that represent both inputs and outputs. To make matters worse, some of the signals are discrete—that is, on/off—and some are continuously varying analog signals. In addition, the mass flow controller also requires application of a power supply voltage and return/ground to the flow controller connector.

In general, prior art methods and apparatus require the use of custom cable harnesses designed and built to connect the rigid format of a PLC to the varying formats of the disparate devices such as mass flow controllers and power supplies. The difficulty of designing, fabricating and installing complex wire harnesses is so great that the predominant method of connecting PLC's to sensors and actuators is via individual wire connections and terminal blocks.

Figure 4A:
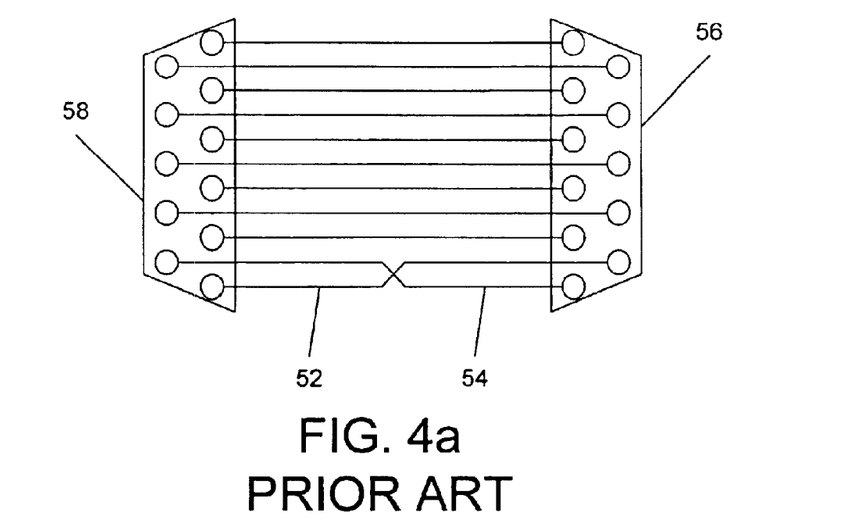
FIG. 4a shows a typical prior art custom cable arrangement.
Figure 4B:
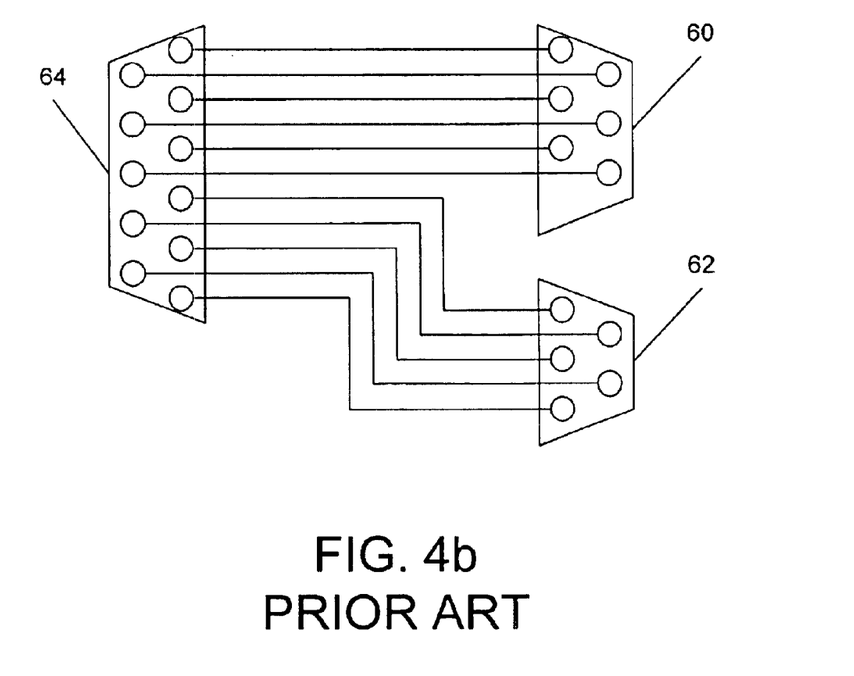
FIG. 4b shows another typical prior art custom cable arrangement.

FIGS. 4a and 4b show two examples of typical nonstandard cable construction. In FIG. 4a each of wires 52 and 54 connects to a different pin on connector 56 than on connector 58. The cable of FIG. 4b has two connectors 60 and 62 on one end and a single connector 64 on the other end.

SUMMARY

It is therefore an object of the present invention to provide a method and apparatus wherein customized connections can be made using standard cables.

It is another object of the present invention to provide a method and apparatus that reduces the cable complexity involved in making interconnections in control systems.

It is a further object of the present invention to provide a method and apparatus for reducing the number of custom designed cables and individual wire connections in a system.

It is an object of the present invention to provide a programmable input/output module for directing signals between apparatus through standard cables.

It is another object of the present invention to provide an improved system for testing cables utilizing programmable input/output modules.

It is a still further object of the present invention to provide an interlock system for a control system that uses programmable input/output modules and standard cables.

Briefly, a preferred embodiment of the present invention includes a system for enabling a system controller to receive a selected signal type from, or apply a selected signal type to any selected one or more of a plurality of cable conductors. An input/output module includes a first connector apparatus for making connection with a first transmission line/cable for conveying signals between the module and the system controller. At least one second connector is provided for connecting to a first end of a second standard cable. A second end of the second standard cable includes a standard cable connector for making connection to a corresponding connector of a device from which data is received or to which a signal is applied. The input/output module is configured to contain programmable logic for enabling the required communication between the controller and the device.

An advantage of the present invention is that it minimizes or eliminates hand wired interconnections.

A further advantage of the present invention is that it reduces the cost of hand wiring, including related documentation, wire stripping, wire labeling, installation and testing.

A still further advantage of the present invention is that it eliminates or minimizes the need for custom cable harnesses.

Another advantage of the present invention is that it reduces the time required to design a new system.

An advantage of the present invention is that it reduces the quantity of part numbers in a system.

A further advantage of the present invention is that it simplifies maintaining systems in the field because a smaller number of cables need to be available to replace damaged or suspected cables.

A still further advantage of the present invention is that it aids in making system design changes, because new cable designs are generally not required.

DETAILED DESCRIPTION OF THE PREFERRED EMBODIMENT

Figure 5:
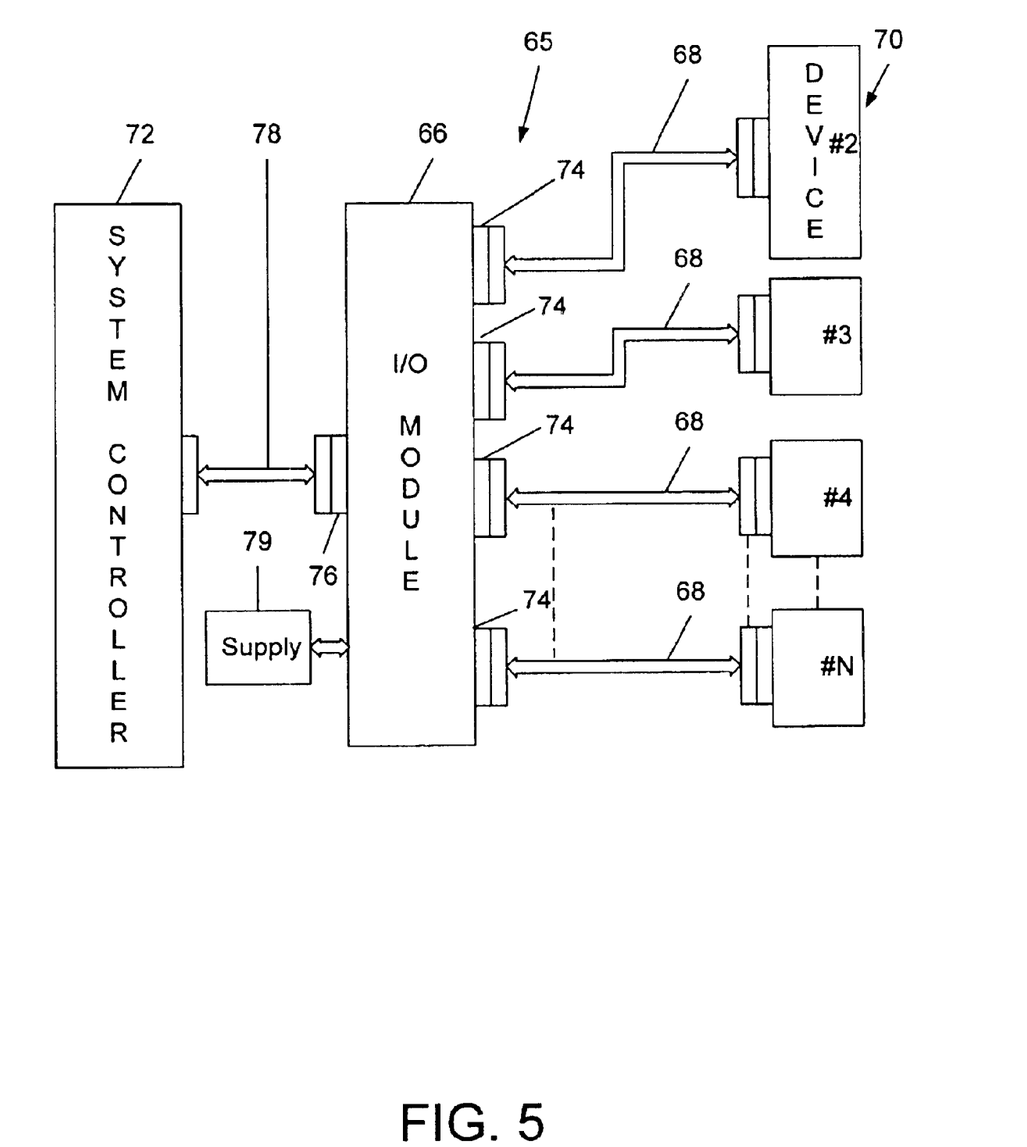
FIG. 5 is a block diagram for illustrating the apparatus and method of the present invention.

Referring now to FIG. 5 of the drawing, a block diagram is presented for illustration of the method and apparatus of a preferred embodiment of the present invention. The apparatus of the present invention includes a configurable input/output system 65 including an input/output module 66 and one or more cables 68. All of the cables 68 are preferably identical, but the present invention also includes variations in the cables 68. Each cable 68 includes one or more conductors. The I/O module 66 according to the present invention includes a microprocessor that is programmable for enabling a particular transmission of a signal between the module 66 and devices 70, and between the module 66 and a system controller 72. The module 66 also preferably includes one or more standard connectors 74 for connection to the standard cables 68. A connector 76 provides connection to a network (preferably Ethernet) 78 for communication between the module 66 and the system controller 72. The module 66 is programmed/configured by input from the system controller 72. Alternatively, the module 66 can be configured to be programmed through use of a separate computer (not shown).

For example, the module 66 may be programmed to connect a power supply voltage from either an external device such as a device 79 or from a supply built into the module 66, to any one or more of wires associated with corresponding cables 68 for transmission to corresponding interconnected devices 70. As another example, the controller 72 may program the module 66 to produce or send a signal on any pin of connector 74.

The module 66 may be programmed to enable transfer of communication data between any one of the devices 70 and the controller 72, and this may involve any required analog to digital (A/D) or digital to analog (D/A) conversion by the module 66.

Figure 6:
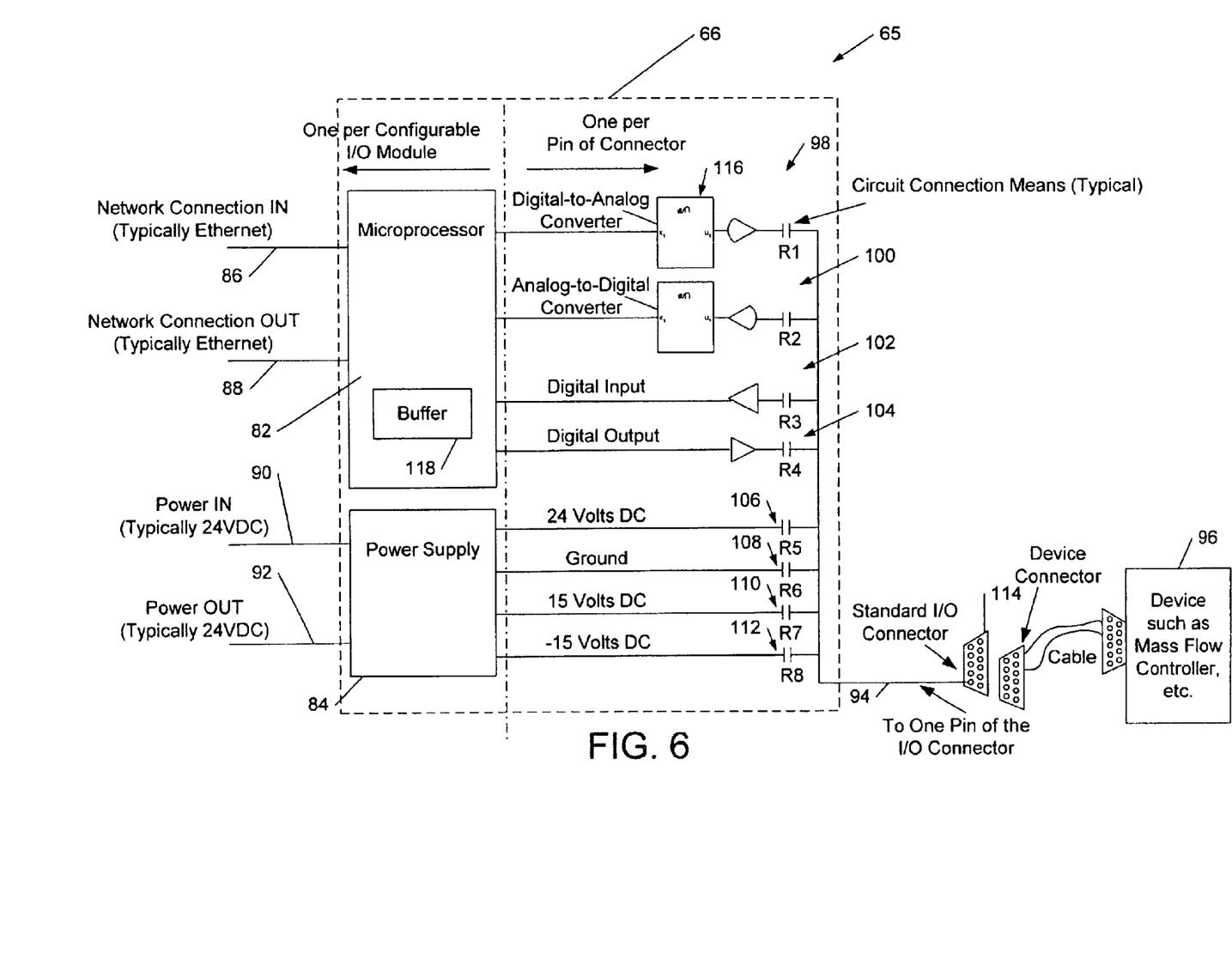
FIG. 6 is a circuit diagram for illustrating further detail of the module of the connectorized configurable system of the present invention.

FIG. 6 will now be referred to for illustration of further details of the I/O module 66. The use of the term "standard" as used in the present specification includes any connector and/or cable that is not selected or designed for a particular connection. The term "standard", in other words is used to distinguish the feature of the present invention that enables the user to direct input to any one of the conductors of a cable without the need to design a special connector or cable wire configuration. The term "standard" as used in this sense may or may not include an "off-the-shelf" connector or cable that may be designed for any of various purposes. Nevertheless, it is a preferred embodiment of the present invention for the method and apparatus to include "standard" connectors and cables in the conventional sense, making wiring less costly, and parts more available.

The I/O module 66 as illustrated in FIG. 6 preferably includes a microprocessor 82 and a power supply 84. Alternatively the power supply can be externally located with interconnection to I/O module 66 as described in reference to FIG. 5. An input line 86 and output line 88 are both shown as required for Ethernet communications between the module 66 and controller 72 according to a preferred embodiment. Other types of interconnections are also included in the present invention according to the type of communications network in use. Line 86 of FIG. 6 represents the connection apparatus required for network communications between a controller such as controller 72 of FIG. 5 and the I/O module 66. Line 88 of FIG. 6 represents the connection apparatus required for communication to another I/O module, such as 124 in FIG. 7 between I/O Modules 120 and 122. In general, the microprocessor 82 is configured/programmed by a controller 72 to receive instruction from the controller as required to sense a particular selected device 96, which may be for example a pressure sensor, temperature sensor, etc., and provide the corresponding data to the system controller. The microprocessor 82 is also programmed/directed by the controller to cause a particular signal to be applied to any selected one or more of conductors of one or more cables such as cable 94. In addition, the microprocessor is programmed to respond to direction to send a selected signal type from a device 96 to the system controller.

Although FIG. 6 shows only one line 94 for simplicity of illustration, the present invention includes any number of lines 94, connectors 114 and devices 96. The module 66 provides a selection of interconnection devices 98–112 for each of any of a plurality of lines 94. Each set of devices 98–112 is dedicated for making a connection to one line 94. The present invention therefore includes a set of interconnection apparatus such as 98–112 and corresponding required programmed logic in the microprocessor 82 for each line 94 leading to each one of the connector pins of connectors 114, the pins for example as indicated by the circles on connector 114, for making connection to any corresponding device such as device 96.

As an example of operation of the system 65, the microprocessor may be programmed to recognize particular input data, included for example in an Ethernet packet on line 86 containing instruction to transmit the data as an analog signal on line 94 to device 96. The programming in this case would instruct the microprocessor to direct/convert the data through apparatus 98 having a digital to analog converter 116. Facility for making this connection is symbolized by relay "R1" which would be activated to make the required connection from the device 116 to the device 96. As another example, if line 94 were to carry 15 volts to the device 96, the microprocessor would be programmed to respond to a signal from the controller to activate relay R6. In this manner, the system 65 allows communication of a selected variety through any line such as 94, and application of any one of a variety of signals to be sent to any selected line such as 94 and thence to a corresponding device 96. The cable connecting to the lines such as line 94 can therefor be any cable capable of transmission of the required signals, which as explained above is preferably a conventionally standard cable.

The circuit switching apparatus (R1–R8) are shown diagrammatically as electromechanical relays. In the preferred embodiment, this switching apparatus is realized in a semiconductor circuit. A semiconductor circuit can be realized far less expensively and can act faster than an electromechanical relay circuit. An electromechanical relay is used in order to show the essence of the invention.

As shown in FIG. 6, any one of the eight signal paths indicated as 98–112 can be interconnected to line 94. FIG. 6 shows, for example, four different power supply signals including 24V DC, ground, 15V DC and –15V DC. The present invention also includes any quantity or value of signals. As described above, the module 66 is configured with a set of inputs such as 98–112 for each line 94 (FIG. 6) in each cable 68 (FIG. 5).

The lines and interconnections can carry any signal type. For example, signals can contain frequency information such as that found in feedback from servo motors. Or these signals can represent serial communication carriers handling, for example, RS-232 data or fieldbus data such as Device Net, Profibus or Ethernet.

FIG. 6 also illustrates the facility for connection of four non-power signals by paths 98–104. Paths 98 and 100 include A/D and D/A converters, as well as switching apparatus (R1 and R2), for situations where such conversion is necessary to accommodate different transmission and reception capabilities/requirements of the controller 72 and a device 70 (such as device 96). Paths 102 and 104 provide for passage of digital signals in either direction. In further explanation, the controller can direct the module 66 to send a digital signal, which when received by the module 66, can be sent to a buffer 118, from which the microprocessor 82 in response to direction from the controller can send the signal to any one of the contacts on connector 114 by activating the required relay in a path such as path 104 to connector 114, to send the required signal to the desired contact of the desired connector. Again, the routing of the signals is symbolically illustrated as accomplished by closing the associated relay (R1–R8). In the case of the aforementioned digital output signal, as shown in FIG. 6, relay R4 would be closed, but relays R1–R3 and R5–R8 would be opened, thus routing the requested digital output to line 94 and the corresponding pin of the standard I/O connector 114. Similarly, the module 66 can receive a digital signal from a device 72, such as device 96, and in response to direction from the controller can send a copy to the controller 72. In this case, relay R3 would be closed, while relays R1–R2 and R4–R8 would be opened, thus routing the digital signal from the given pin of the standard I/O connector 114 through path 102. Paths 98 and 100 accommodate analog to digital conversion as required. Finally, the configurable I/O system 65 can be isolated from a signal such that the signal appears to be disconnected. This disconnection is achieved by opening all relays, R1–R8.

Referring again to FIG. 5, a preferred method of the present invention includes the use of the system 65 in a control system wherein a controller 72 receives data from or sends data to one or more devices 70 through an I/O module 66 that is programmed to receive signals from and place signals on any selected conductor of a selected cable to a device 70. In a preferred embodiment, the device 72 is a system controller in communication with the I/O module 66 through an Ethernet system 78. Alternatively, the device 72 can be of other configuration, such as a general purpose computer, and the communications line 78 can be of any type, such as a standard computer cable, etc.

Figure 7:
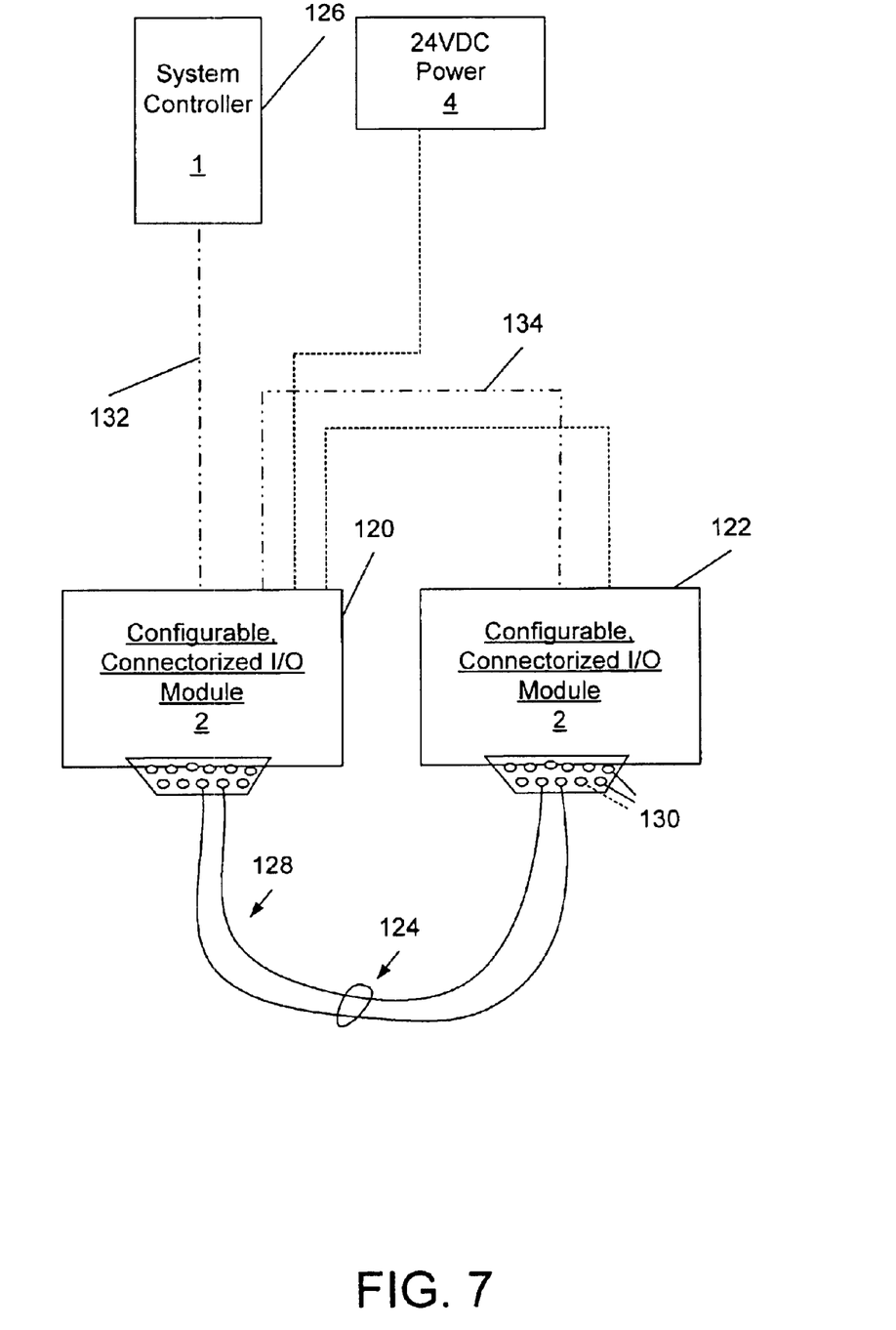
FIG. 7 is a block diagram illustrating a system for testing cables using the module of the present invention.

A further method of the present invention includes the use of the module 66 for testing cables. FIG. 7 shows a first I/O module 120, connected to a second I/O module 122 with a cable 124 to be tested. According to a preferred embodiment, a system controller 126 is programmed to direct module 120 to place a particular signal on a selected one of wires 128 in cable 124. The signal can be for example, a DC supply voltage or other signal type as required for testing the cable 124. The controller directs the second module 122 to scan the pins 130 of the second module 122. The results of the scanning are sent to the controller 126, whereby the controller can know if the correct signal is on the correct pin to determine the condition of the cable. In addition to determining the quality of transmission through a single selected cable conductor, the controller can scan and detect a signal on any pin 130 of the connector of module 122, and therefore can determine if any of the conductors 128 are shorted to each other, and can determine the level of cross talk between the conductors 128. FIG. 7 shows dashed lines 132 and 134 representing communication lines between the system controller 126 and the Modules 120 and 122.

Figure 8:
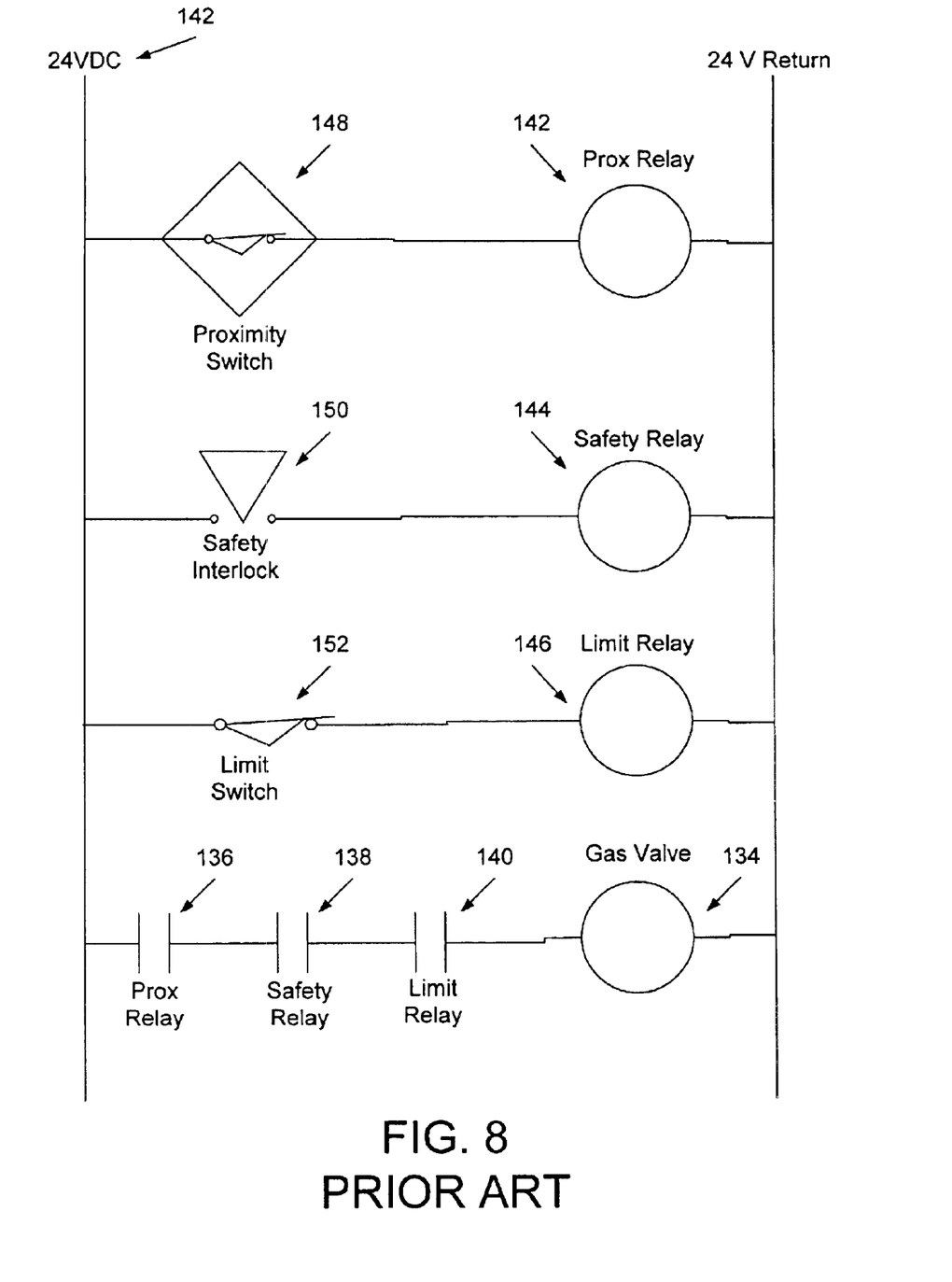
FIG. 8 is a diagram of a prior art interlock system.

A still further embodiment of the present invention includes a method wherein a module configured to include the features of module 66 is combined with an interlock for providing a safety feature in a system. FIG. 8 illustrates a prior art interlock system for protecting use of a gas valve 134. Three relays 136, 138 and 140 must conduct current from a 24VDC supply 142 in order for the gas valve 134 to receive operating power. The electrical windings for operating the relays 136, 138 and 140 are symbolized by the circles 142, 144 and 146. The power to each winding is controlled by the sensor units 148, 150 and 152. If any one of the three sensor units is activated and therefore disconnects power to the corresponding winding, the associated relay disconnects/open circuits and shuts off power to the gas valve. The interlock circuit of FIG. 8 is often built into a custom circuit board requiring custom wiring.

Figure 9:
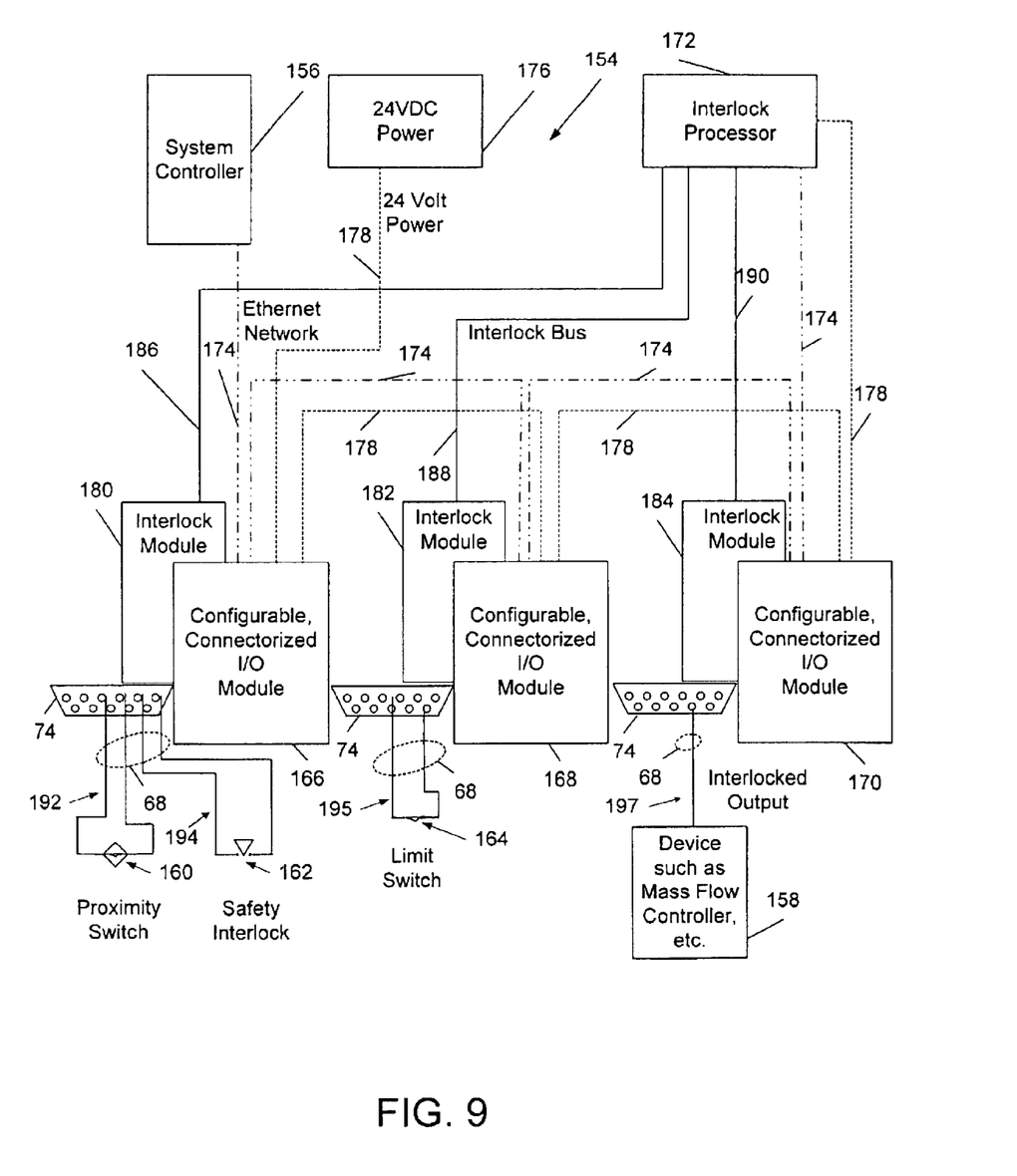
FIG. 9 is a block diagram of an interlock system using the configurable connectorized input/output module of the present invention.

An embodiment of a method of the present invention is illustrated in FIG. 9 wherein configurable connectorized I/O Modules 166, 168 and 170, such as module 66, are used to minimize or eliminate custom wiring in an interlock system. The Modules 166, 168 and 170 may be similar or identical to the module 66 of FIGS. 5 and 6 with connections to the interlock Modules 180, 182 and 184. The interconnections indicated in FIG. 9 can all or in part be accommodated with standard connectors and cabling, with the specific direction/routing of signals accomplished by programming the configurable, connectorized I/O modules.

The exemplified system 154 of FIG. 9 includes a system controller 156 for controlling an operation including a device 158 such as a mass flow control, etc. The system 154 includes an interlock system that allows operation of the device 158 only if the state of all three safety sensors 160, 162 and 164 indicate that operation conditions are appropriate. The sensors can be of any type for the purpose. The three examples are a proximity switch 160, a safety interlock 162 and a limit switch 164.

The system controller 156 is connected to each of the three configurable, connectorized I/O Modules 166, 168 and 170 which provide the programmable flexibility as described above, to allow standard cables and connectors to be used throughout the system to make the various connections indicated. I/O Modules 166, 168 and 170 are shown overlapping the interlock Modules 180, 182 and 184 indicating that the interlock Modules 180, 182 and 184 plug into the I/O Modules 166, 168 and 170. In the preferred embodiment, the interlock Modules 180, 182 and 184 plug into connector 74 of an 110 module such as Module 66 of FIG. 5 in place of a cable 68. The interlock Modules 180, 182 and 184 each contain a device connector 74 into which a cable 68 plugs for interconnecting the devices 158–164. The interlock Modules 180, 182 and 184 therefore reside between the 110 Modules 166, 168 and 170 and the devices 158–164 to which they attach, including as shown by example in FIG. 9 a proximity switch 160, limit switch 164, and safety interlock 162, and device 158.

The system controller 156 communicates with I/O Modules 166, 168 and 170, and with the interlock processor 172 by way of a network, such as Ethernet as indicated by lines 174. Apparatus for accomplishing Ethernet communication will be understood to those skilled in the art, and this need not be illustrated in order to reproduce the invention. A power supply 176 is shown with the connections symbolized by lines 178. An interlock module (180, 182, 184) is attached to each of the I/O modules (166, 168, 170). Each interlock module (180–184) is attached to the interlock processor 172 through cables/buses as indicated by lines 186, 188 and 190.

The interlock system of FIG. 9 will not be explained in further detail. In general, the system 154 includes interlock modules (180, 182, 184) connected to an interlock processor 172 via bus lines (186, 188, 190). The Interlock Modules have two functions: (1) The first function, of the Interlock Modules 180 and 182, is to transmit the state of certain inputs, for example 192, 194 and 195 from sensors 160, 162 and 164, such inputs being a subset of all inputs and being called Interlock Inputs, to the Interlock Processor 172 via the Interlock Buses 186 and 188. Any input (192, 194, 195) connected to any interlock module (180–184) can be wired within the interlock module such that the input drives a relay coil, as shown in FIG. 8, with relay coils labeled (142, 144, 146). When these relay coils are actuated, the associated relay contacts close. These relay coils each activate a contact resulting in a signal being sensed by or sent to the Interlock processor 172 via the interlock buses 186 and 188 to the Interlock Processor 172. The function of the Interlock Processor will be described shortly. (2) The second function, of the Interlock Module 184, is to receive one or more interlock signals from the Interlock Processor 172 via the Interlock bus 190. The Interlock Processor is wired such that the interlock signal or signals that the processor sends on the bus 190 drives a coil of a relay located in the Interlock module 184 whose contacts are in series with an output of the I/O module 170. This output 197 is therefore interlocked. That is, the I/O module 170 can attempt to turn on an output connected to the device 158, but that output 197 will be prevented from progressing outside the Interlock Module 184 (that is, interlocked) unless the Interlock Processor 172 drives a signal on the Interlock bus 190 which closes a relay in series with the output 197. The Interlock Processor 172 is responsive to inputs from the Interlock Modules 180 and 182 by performing Boolean logic upon the inputs to generate one or more interlock outputs on bus 190 that are routed to the Interlock Module 184 and thereby interlock output 197 from the I/O Module 170. The Interlock Processor 172 preferably does all of its processing using relays. Relays are common in safety circuits since they are simple and reliable. Silicon switches and microprocessors have the reputation for being less reliable and prone to various hardware or software glitches. Nonetheless, nothing in this application precludes the use of silicon processors, switches or logic. The cables 186, 188 and 190 are shown making direct connection between each interlock module and the interlock processor.

In operation, the proximity switch 160 provides an interlock input 192 that is connected directly to the first interlock module 180. The safety interlock 162 provides a similar input 194. These two interlock inputs 192 and 194 are sensed by the system controller 156 by way of connection between the interlock module 180 and the I/O module 166, and input monitoring communications between the I/O module 166 and system controller 156 by way of network 174. The interlock module 180 contains one relay for each interlock input 192 and 194. These relays (not shown) are for driving a signal via the Interlock Bus 186 to the Interlock Processor 172. The Interlock Processor 172 contains one relay for each interlock input 192 and 194. The relays are arranged within the Interlock Processor 172 to perform a Boolean operation on the Interlocks 160, 162, 164 and generate an interlock output that is routed via the Interlock Bus 190 to the Interlock Module 184. Inside the Interlock Module 184 is one relay (not shown) for each output such as output 197 to be interlocked. In other words, although only one output 197 to one device 158 is shown in FIG. 9, the concept of the present invention applies to any number of inputs, outputs and devices. When the Interlock Processor 172 determines that the Interlock inputs 160, 162, 164 are in their correct states for proper system operation, the Interlock Processor 172 drives a signal via the Interlock bus 190 and causes the relay in the Interlock Module 184 to close, thus allowing an output on line 197 and therefore the device 158 to be enabled or turned on.

While a particular embodiment of the present invention has been shown and described, it will be obvious to those skilled in the art that changes and modifications may be made without departing from the spirit of the present invention, and therefore the appended claims are to include these changes and alterations as follow within the true spirit and scope of the present invention.

What is claimed is:

1. A configurable connectorized system comprising:
   (a) a module including
      (i) a first connector apparatus including a first plurality of connectors for connecting a first plurality of cables between said, module and a first plurality of devices; and
      (ii) directing apparatus responsive to an input signal from a control apparatus for causing said module to place any of a plurality of signals on any of a plurality of connector pins of said first plurality of connectors wherein said directing apparatus includes a plurality of distribution networks with each distribution network having a plurality of selectable paths leading to a particular said connector pin of said first connector apparatus, with each path for connecting a selected one of a plurality of signal types with a selected said connector pin.

2. A system as recited in claim 1 wherein said module further includes a second connector apparatus for connecting a cable between said module and said control apparatus.

3. A system as recited in claim 1 wherein said module further includes an internal signal source and said directing apparatus is further programmable to connect a signal from said internal signal source to a said connector pin.

4. A system as recited in claim 1 wherein said paths in each said distribution network include
   (a) at least one first path selectable for connection of operational power to said selected connector pin;
   (b) at least one second path selectable for connection of a digital signal to said selected connector pin;
   (c) at least one third path selectable for connection of a power supply return to said selected connector pin.

5. A system as recited in claim 1 wherein said paths include at least one path having a digital to analog converter.

6. A system as recited in claim 1 wherein said paths include at least one path having an analog to digital converter.

7. A system as recited in claim 1 wherein said directing apparatus includes a microprocessor.

8. A system as recited in claim 7 wherein said module includes a power supply for providing said supply voltage.

9. A system as recited in claim 1 wherein said plurality of signals includes a signal type including frequency information.

10. A system as recited in claim 9 wherein said frequency information represents serial communication.

11. A configurable connectorized system comprising:
    (a) a module including
       (i) a first connector apparatus including a first plurality of connectors for connecting a first plurality of cables between said module and a first plurality of devices; and
       (ii) directing apparatus responsive to an input signal from a control apparatus for causing said module to place any of a plurality of signals on any of a plurality of connector pins of said first plurality of connectors wherein said directing apparatus is programmable to direct said module to output a first signal to said controller wherein said first signal conveys data content of a signal input to said module to a selected one of said connector pins of said first connector apparatus from a corresponding said device.

12. A configurable connectorized system comprising:
    (a) a module including
       (i) a digital to analog converter;
       (ii) a first connector apparatus including a first plurality of connectors for connecting a first plurality of cables between said module and a first plurality of devices; and
       (iii) directing apparatus responsive to an input signal from a control apparatus for causing said module to place any of a plurality of signals on any of a plurality of connector pins of said first plurality of connectors, wherein said directing apparatus is programmable to direct reception of a digital signal from said controller and cause said signal to be converted by said digital to analog converter to an analog signal, and to place a copy of said analog signal on any selected one of said connector pins.

13. A configurable connectorized system comprising:
    (a) a module including
       (i) an analog to digital converter;
       (ii) a first connector apparatus including a first plurality of connectors for connecting a first plurality of cables between said module and a first plurality of devices; and
       (iii) directing apparatus responsive to an input signal from a control apparatus for causing said module to place any of a plurality of signals on any of a plurality of connector pins of said first plurality of connectors wherein said directing apparatus is programmable to detect an analog signal on any selected contact of said first connector apparatus and cause said analog to digital converter to convert said signal to a digital signal and output a copy of said digital signal to said controller.

14. A configurable connectorized system comprising:
    (a) a module including
       (i) a first connector apparatus including a first plurality of connectors for connecting a first plurality of cables between said module and a first plurality of devices; and
       (ii) directing apparatus responsive to an input signal from a control apparatus for causing said module to place any of a plurality of signals on any of a plurality of connector pins of said first plurality of connectors wherein said directing apparatus is programmable to cause a power supply voltage to be connected to a first selected connector pin of said first connector apparatus, and to cause a power supply return to be connected to a second selected connector pin of said first connector apparatus.

15. A control system comprising:
    (a) at least one device to be controlled;
    (b) a system controller for directing operation of said at least one device;
    (c) a first cable apparatus including a first cable for connection of a first end to said system controller;

(d) a second cable apparatus including a second cable for each said device with each said second cable having a first end for connection to a corresponding said at least one device; and (e) a first module including
   (i) a first connector for connecting to a second end of said first cable;
   (ii) a second connector for connecting to each second end of each said second cable; and
   (iii) directing apparatus responsive to direction from said controller for directing transmission of any one of a plurality of signal types between said module and a selected said device through a selected one of a plurality of contacts on a corresponding said second connector, and for directing transmission of a said signal between said controller and said first module.

16. A configurable connectorized cable testing system comprising:

(a) A first module including
   (i) a first connector for connecting to one end of a cable to be tested;
   (ii) a second connector for connecting to one end of a cable for connecting to a first computer apparatus;
   (iii) first directing apparatus responsive to a command signal from said computer apparatus for applying one of a plurality of signals generated within said first module to a selected contact of said first connector for transmission through said cable to be tested;

(b) a second module including
   (i) a third connector for connecting to a second end of said cable to be tested;
   (ii) a fourth connector for connection of a cable for connecting to said first computer apparatus;
   (iii) second directing apparatus responsive to a command signal from said computer apparatus for sensing any signal on a contact of said third connector and sending corresponding data to said first computer apparatus through said cable for connecting to said first computer apparatus for verifying an operational condition of said cable to be tested.

17. A configurable connectorized system comprising:

(a) a module including
   (ii) a first connector apparatus including a first plurality of connectors for connecting a first plurality of cables between said module and a first plurality of devices; and
   (ii) directing apparatus responsive to an input signal from a control apparatus for causing said module to place any of a plurality of signals on any of a plurality of connector pins of said first plurality of connectors, wherein said plurality of signals includes a signal type including frequency information, and wherein said frequency information is feedback information from a servo motor.

* * * * *